Aug. 27, 1963 W. H. ANDERSON Re. 25,437

TELEVISION ANTENNA HAVING MULTI-BAND ELEMENTS

Original Filed April 22, 1955 2 Sheets-Sheet 1

INVENTOR
WARNER H. ANDERSON

BY Warren D. Hackbert
ATTORNEY

TELEVISION ANTENNA HAVING MULTI-BAND ELEMENTS

Original Filed April 22, 1955 2 Sheets-Sheet 2

INVENTOR
WARNER H. ANDERSON
BY Warren D. Hackbert
ATTORNEY

United States Patent Office

Re. 25,437

Reissued Aug. 27, 1963

25,437

TELEVISION ANTENNA HAVING MULTI-BAND ELEMENTS

Warner H. Anderson, McCleansboro, Ill., assignor, by mesne assignments, to Channel Master Corporation, Ellenville, N.Y., a corporation of New York Original No. 2,980,912, dated Apr. 18, 1961, Ser. No. 503,275, Apr. 22, 1955. Application for reissue Sept. 18, 1962, Ser. No. 224,586

8 Claims. (Cl. 343—802)

Matter enclosed in heavy brackets [ ] appears in the original patent but forms no part of this reissue specification; matter printed in italics indicates the additions made by reissue.

The present invention relates to television antennas and more particularly to a television antenna which functions effectively in both the low and high frequency bands of the very-high-frequency television spectrum.

Until the present time, it has been difficult to effectively receive a television signal over the entire very-high-frequency television spectrum without employing a multiplicity of antennas, such as the conventional yagi, for example, cut for the various channel frequencies, especially when the reception was desired in the so-called fringe areas or where the antenna location was undesirable due to other fractors. The all-channel antennas heretofore utilized were predominantly responsive to a selected channel or frequency, generally proving passive or inferior in other selected channels or frequencies. Thus, the present all-channel antenna might be superior in the low frequency band, represented by channels 2–6, inclusive, but provide weak or inferior reception of signals in the upper frequency band, represented by channels 7–13, inclusive.

By virtue of the applicant's novel structure, a television antenna is provided which permits effective and practically equal signal response in both the low and high frequency bands. The novel antenna disclosed herein utilizes a dual band director system comprising structures operating as resonant directors in the low frequency band and as colinear directors in the high frequency band, and a collector system comprising low band folded dipoles shorted on either side of the mid-points thereof to secure good impedance matching in both the low and high frequency bands and an improved pattern in the high frequency band.

The present invention has, therefore, as a principal object the provision of a television antenna which effectively receives a television signal in both the low and high frequency bands of the very-high-frequency television spectrum.

A further and more general object of the invention is to provide a television antenna which operates in all channels without the necessity of utilizing multiple units cut for each desired channel or frequency.

Another object of the invention is to provide an all-channel television antenna which is easy to assemble and which is readily adaptable to various mounting installations.

Other objects and a better understanding of the invention will become more apparent from the following detailed description, taken in conjunction with the accompanying drawings, in which.

Figure 1:
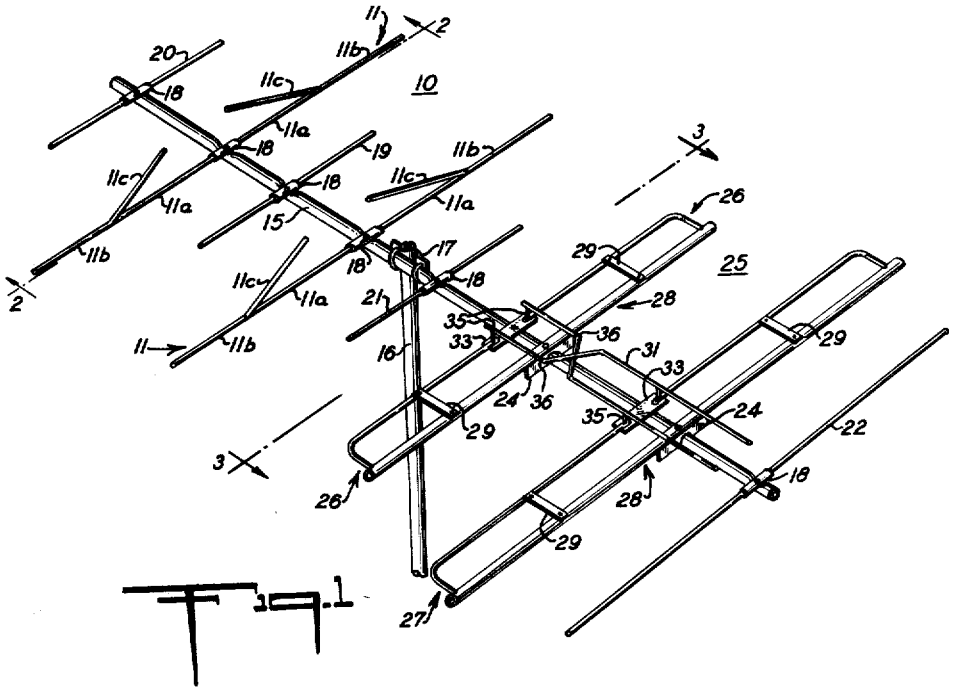
FIGURE 1 is a diagrammatic view in perspective, looking downward, of the assembled antenna structure, showing the director system and a typical form of collector system.

For the purposes of promoting an understanding of the principles of the invention, reference will now be made to the embodiment illustrated in the drawings, and specific language will be used to describe the same. It will nevertheless be understood that no limitation of the scope of the invention is thereby intended, such alterations and further modifications in the illustrated device, and such further applications of the principles of the invention as illustrated therein, being contemplated as would normally occur to one skilled in the art to which the invention relates.

Referring now to FIGURE 1, a completely assembled antenna structure is shown comprising a director system 10 and a collector system 25, a boom 15 being provided to support the elements thereof. The boom 15 is supported at the desired antenna locations by a mast 16, a conventional U-bolt and saddle assembly 17 providing the connection therebetween, for example. The antenna elements and the boom 15 are, in the preferred embodiment, formed from lightweight aluminum tubing in various diameter stock, as is the conventional practice in the art.

Figure 2:
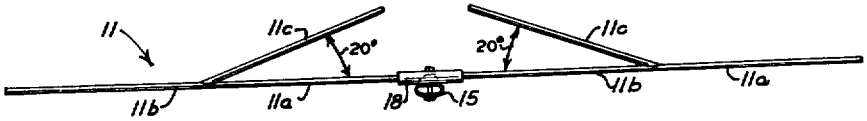
FIGURE 2 is a diagrammatic view in elevation, taken at line 2—2 of FIGURE 1 and looking in the direction of the arrows, showing an element of the director system embodied in the present invention.
Figure 3:
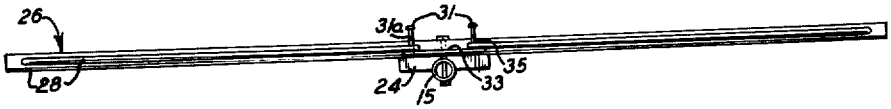
FIGURE 3 is a diagrammatic view in elevation, taken at line 3—3 of FIGURE 1 and looking in the direction of the arrows, showing the collector system embodied in the present invention.

As shown in FIGURE 1 and more particularly in FIGURE 2, the typical director system 10 comprises several unitary elements 11 grounded or fastened to the boom 15 at their center or mid-points by means of conventional clamp assemblies 18, for example. Each unitary element 11 comprises sections 11a and 11b on either side of the mounting. Sections 11c extend from and connect to each of the unitary elements 11, as by riveting, for example. Sections 11a and 11b forming each unitary element 11 combine with sections 11c to function as a resonant director in the low frequency band, while sections 11b and 11c combine to function as colinear directors in the high frequency band, operating independently of sections 11a of unitary element 11 since the colinear directors are positioned at locations which electrically represent points of minimum voltage in the high frequency band. The corresponding sections 11c for the unitary element 11 lie in the vertical plane thereof and to operate properly as a part of the high frequency band directors extend upwardly and away from the horizontal plane of the boom 15 and the unitary elements 11. Sections 11c are located away from sections 11a at a position permitting optimum high frequency band operation with sections 11b, yet avoiding a distance effecting more vertical directivity than the desired horizontal directivity. In the present typical embodiment, sections 11c form an angle with respect to sections 11a of unitary element 11 approximating 20 degrees, for example.

The director system 10 may include any number of unitary elements 11, with a conventional director element 19 between each pair thereof. The typical director system 10 disclosed herein is completed by a conventional director element 20 and a conventional director element 21 positioned immediately adjacent the collector system. It is understood, however, that the director system is capable of functioning without the use of the director element 19 or the director element 20, if desired.

Electrically, the director system 10 functions in a dual capacity in operating as a resonant director in the low frequency band and as colinear directors in the high frequency band. Since sections 11c are supported on the unitary element at the minimum voltage points in the high frequency band between sections 11a and 11b, sections 11b and 11c function as high frequency band directors independently of sections 11*a*.

The collector system 25 shown in FIGURE 1 comprises a front section 26 and a rear section 27, each of the sections comprising a folded dipole 28 with shorting bars 29 located thereon on either side of the mid-points at positions representing good impedance for the collector system in the low and high frequency bands, to be discussed below. Each of the folded dipoles 28 are made of tubing having unequal diameters, which provides the necessary impedance step-up if the sections 26 and 27 are placed close together. The use of shorting bars 29 and the unequal diameter tubing for the folded dipoles 28 provide unequal currents and hence a good impedance match for the system.

Folded dipole sections 26 and 27 each connect to the boom 15 by means of conventional clamps 24, for example, insulators 33 being positioned at boom 15 to receive the electrically open ends thereof. A phasing section 31 spaced above the plane of the front section 26 and the rear section 27 by spacers 31a connected therebetween as by bolting through insulators 33 at 35, a television transmission line (not shown) connecting to the collector system at feedpoint 36 on phasing section 31. It should be apparent from the drawings that the principal difference between the front section 26 and the rear section 27 is the longer folded dipole 28 of the rear section 27.

Electrically, the function of the front section 26 of the collector system 25 is to resonate near the high end of the low frequency band, the front section 26 being shorted along its length of folded dipole 28 to present a proper impedance match at the feedpoint 36 of the collector system 25 in the low and high frequency band and an improved field pattern in the high frequency band. The field pattern of the front section 26 is similar to that of a half wave dipole in the high frequency band and also at the high end of the low frequency band. When the folded dipole 28 comprising the front section 26 is shorted to afford the desired pattern in the high frequency band, a proper impedance match results in both the low and high frequency bands at the feedpoint 36 of the collector system 25. The rear section 27 of the collector system 25 resonates near the low end of the low frequency band, the folded dipole 28 thereof being shorted along its length to present an impedance at the feedpoint 36 which in combination with the impedance presented thereat by the front section 26 affords a good impedance match to 300 ohm television transmission line throughout the low and high frequency bands. Hence, it should be apparent that the collector system 25 provides effective dual band all-channel coverage for very-high-frequency television operation.

The typical phasing section 31 shown herein connecting the front section 26 and the rear section 27 of the collector system 25 is approximately ½ wave length at the center of the high frequency band, with the front section 26 and the rear section 27 connecting thereto at points approximately ¼ wave length apart at the low end of the high frequency band. In the typical embodiment disclosed herein, the television transmission line connects to the phasing section 31 at approximately ¼ wave length in the middle of the high frequency band, at 36, in front of the rear section 27.

Figure 4:
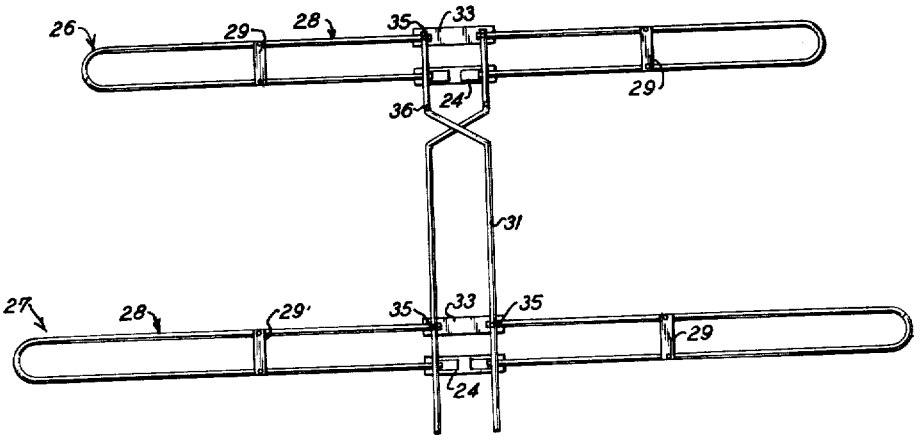
FIGURE 4 is a diagrammatic plan view of an alternate form of collector system equally adaptable for use with the antenna shown in FIGURE 1.
Figure 5:
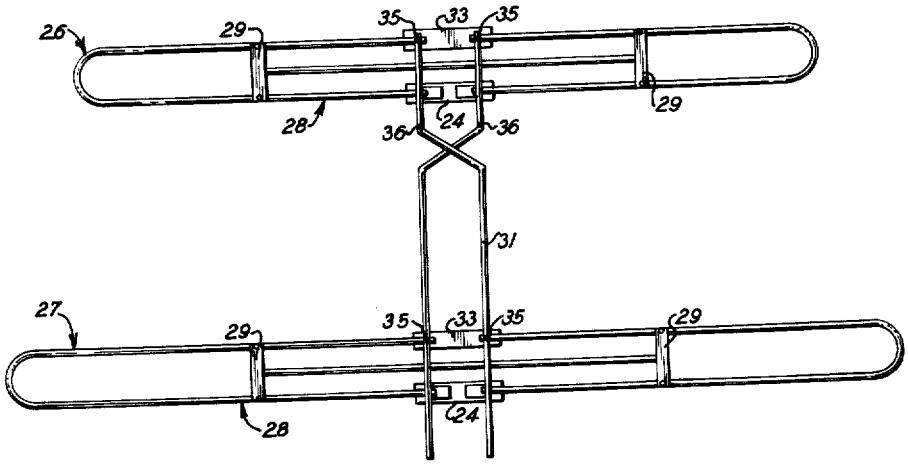
FIGURE 5 is a diagrammatic view of another form of collector system embodying the teachings of the present invention adaptable for use with the antenna of FIGURE 1.

FIGURE 4 and FIGURE 5 disclose modified or alternate forms of collector system capable of use with the novel director system 10 disclosed herein. The collector system of FIGURE 4 is similar to the system disclosed in FIGURE 1, except that the tubing forming the folded dipole 28 is of equal diameter. The collector system of FIGURE 5 discloses front and rear sections, 26 and 27, respectively, comprising folded dipoles 28 with an additional element 30 connecting the shorting bars 29 thereof.

In a typical antenna constructed in accordance with the invention, the length of the folded dipole 28 forming the front section 26 of the collector system 25 approximates 70 inches, with a spacing of approximately 5 inches between the folded-back elements of the dipole 28. The rear section 27 of the collector system 25 approximates 98 inches in length for the folded dipole 28, again with a 5 inch separation between the folded-back elements of the dipole 28. The front section 26 and the rear section 27 of the collector system 25 are approximately 17 inches apart, with the phasing section 31 therebetween approximating 29 inches in length.

From the preceding description, it should be apparent that the applicant has provided a novel television antenna capable of effective all-channel operation. The antenna is susceptible to changes in material and dimensions, and it is readily apparent that the dual band director system and the collector system may be combined in many different arrays. Thus, the above description should be considered as illustrative and not as limiting the scope of the following claims.

I claim:

1. A collector system for an all-channel television antenna comprising a plurality of dipole sections, each section comprising substantially parallel arms extending outward from the midpoint thereof and joined at their outer ends, at least one of said sections being shorted by respective conductors connected between the substantially parallel arms at substantially corresponding points on both sides of the mid-point of said section and a phasing section connecting said sections, the ratio of the distance between the center of each dipole and its shorting conductors to the distance between the center of the dipole and the end thereof being substantially less than the ratio of the velocity constant of the dielectric between parallel arms of the folded dipole relative to the velocity constant of air.

2. In a collector system for an all-channel very-high-frequency television antenna, a front section comprising a folded dipole, a rear section comprising a folded dipole of greater length than said dipole of said front section, each section comprising substantially parallel arms extending outward from the midpoint thereof and joined at their outer ends, each of said sections being shorted by respective conductors connected between the substantially parallel arms at substantially corresponding points on both sides of the mid-point thereof representing a desired impedance in the low and high frequency bands considering the impedance of the entire collector system, the ratio of the distance between the center of each dipole and its shorting conductors to the distance between the center of the dipole and the end thereof being substantially less than the ratio of the velocity constant of the dielectric between parallel arms of the folded dipole relative to the velocity constant of air, and a phasing section connecting said front section and said rear section.

3. In a collector system for an all-channel television antenna, a front section comprising a folded dipole having a mid-point, a rear section comprising a folded dipole having a mid-point, each section comprising substantially parallel arms extending outward from the midpoint thereof and joined at their outer ends, said front and said rear sections each having shorting conductors positioned between said substantially parallel arms at positions representing a desired impedance in the low and high frequency bands considering the impedance of the entire collector system, and a phasing section connecting said mid-point of said folded dipole of said front and said rear section, the ratio of the distance between the center of each dipole and its shorting conductors to the distance between the center of the dipole and the end thereof being substantially less than the ratio of the velocity constant of the dielectric between parallel arms of the folded dipole relative to the velocity constant of air.

4. In an all-channel very-high frequency television antenna, in combination, a director system comprising a unitary element and other elements attached to said unitary element, said unitary element having inboard and outboard portions and said other elements being joined to their respective unitary elements at the junction of inboard and outboard portions and disposed at obtuse angles with reference to the associated outboard portions, said other elements combining with said inboard and said outboard portions of said unitary element to serve as a resonant low frequency band director and with said outboard portions of said unitary element to serve as high frequency band directors, the junction of said outboard portions of said unitary element and said other elements forming said high frequency band directors representing minimum voltage points thereof in the high frequency band, and a collector system comprising a folded dipole as a front section and a folded dipole of greater length than said folded dipole of said front section as a rear section, each section comprising substantially parallel arms extending outward from the midpoint thereof and joined at their outer ends, said collector system being disposed substantially coplanar with said director system and spaced therefrom in the direction of propagation of received signals, each of said sections being shorted by respective conductors connected between the substantially parallel arms at substantially corresponding points of the mid-points thereof representing a desired impedance in the low and high frequency bands considering the impedance of the entire collector system, and a phasing section connecting said front section and said rear section, the ratio of the distance between the center of each dipole and its shorting conductors to the distance between the center of the dipole and the end thereof being substantially less than the ratio of the velocity constant of the dielectric between parallel arms of the folded dipole relative to the velocity constant of air.

5. In an all-channel very-high-frequency television antenna, in combination, a collector system comprising a plurality of folded dipole sections, each section comprising substantially parallel arms extending outward from the midpoint thereof and joined at their outer ends, at least one of said sections being shorted by respective conductors connected between the substantially parallel arms at substantially corresponding points on both sides of the midpoint of said section and a phasing section connecting said sections, the ratio of the distance between the center of each dipole and its shorting conductor to the distance between the center of the dipole and the end thereof being substantially less than the ratio of the velocity constant of the dielectric between parallel arms of the folded dipole relative to the velocity constant of air, and a director system adapted to serve as both a high frequency band director and a low frequency band director, said director system comprising at least one parasitic element having outwardly extending arms substantially coplanar with the arms of said folded dipole sections spaced in front of said folded dipole sections.

6. Apparatus as claimed in claim 5 wherein said director system comprises two distinct types of parasitic director elements, the first being too short to function effectively as a low frequency band director and the second being long enough to function effectively as a low frequency band director.

*7. A very-high-frequency television antenna for the low frequency band and the high frequency band comprising a plurality of horizontal active dipole antenna elements, means for connecting each said element to a signal transmission line, each said element being effective in both said low and high frequency bands, at least one parasitic antenna element comprising two oppositely extending elongated electrically interconnected arms disposed horizontally on respective sides of the axis of said antenna and spaced along said axis from one of said active dipole antenna elements, each said arm having a substantially straight conductive branch section joined conductively with it at a portion of said arm intermediate the ends thereof corresponding to a minimum voltage point in the high frequency band and extending in a generally vertical plane at an angle of approximately 160° from the outer portion of said arm, said branch sections being shorter than said arms and terminating short of the vertical projection of the inner end of said arms, said arms cooperating with said branch sections to form a low frequency parasitic antenna element, and said branch sections forming high band parasitic elements in conjunction with the outer portion of the respective arms to which they are joined.*

*8. A very-high-frequency television antenna for the low frequency band and the high frequency band comprising a plurality of horizontal active dipole antenna elements, means for connecting each said element to a signal transmission line, said elements in combination being effective throughout said low and high frequency bands, at least one parasitic antenna element comprising two oppositely extending elongated electrically interconnected arms disposed horizontally on respective sides of the axis of said antenna and spaced along said axis from one of said active dipole antenna elements, each said arm having a conductive branch section joined conductively with it at a portion of said arm intermediate the ends thereof and extending at an obtuse angle from the outer portion of said arm, said branch sections being shorter than said arms and terminating short of the vertical projection of the inner end of said arms, said arms cooperating with said branch sections to form a low frequency parasitic antenna element, and said branch sections forming high band parasitic elements in conjunction with the outer portion of the respective arms to which they are joined.*

References Cited in the file of this patent or the original patent

UNITED STATES PATENTS

| | | |
|---|---|---|
| 2,283,938 | McKesson | May 26, 1942 |
| 2,533,529 | Spindler | Dec. 12, 1950 |
| 2,535,298 | Lattin | Dec. 26, 1950 |
| 2,648,768 | Woodward | Aug. 11, 1953 |
| 2,700,105 | Winegard | Jan. 18, 1955 |
| 2,705,283 | Thomas | Mar. 29, 1955 |
| 2,821,711 | Lo | Jan. 28, 1958 |

OTHER REFERENCES

Noll et al.: "Television and F.M. Antenna Guide," Macmillan Co., 1951, pages 272–273.